July 29, 1958     E. O. THEN     2,845,175
COUPLING DEVICE FOR CONTAINERS
Filed April 25, 1955     2 Sheets-Sheet 1
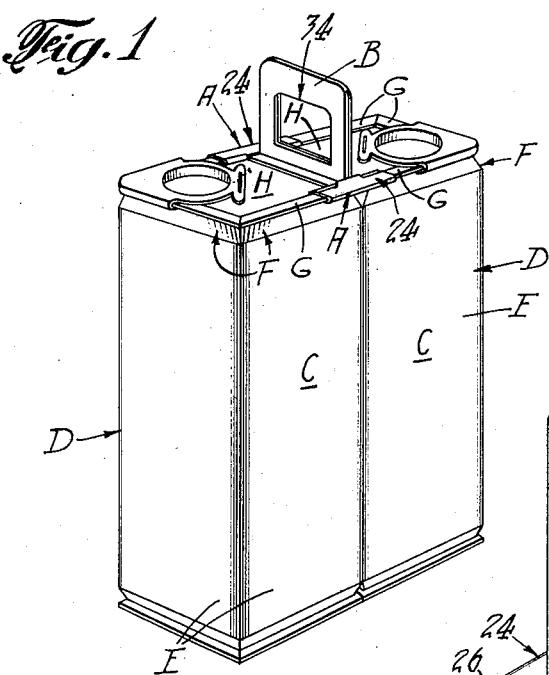
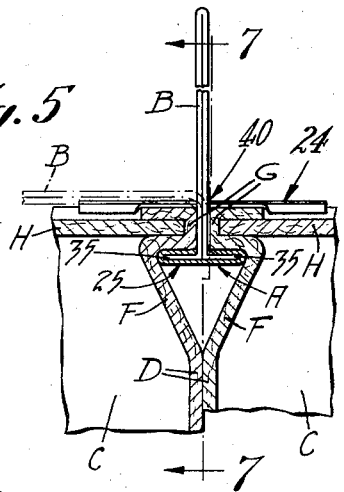
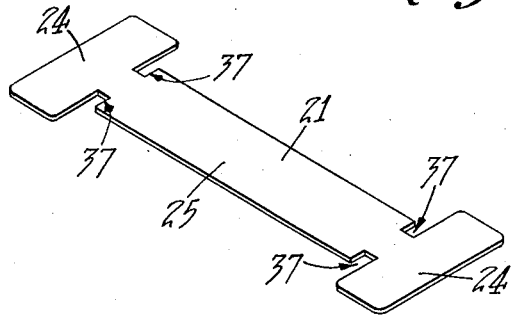
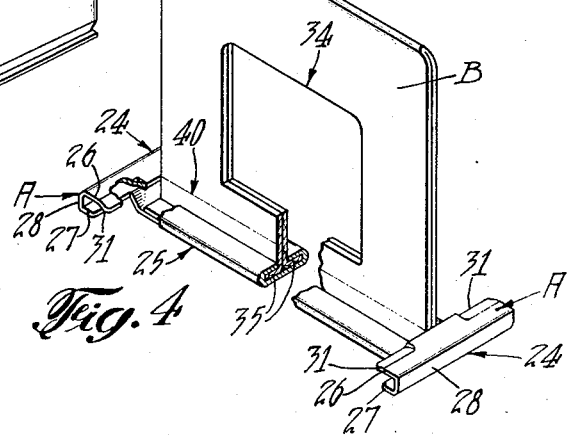
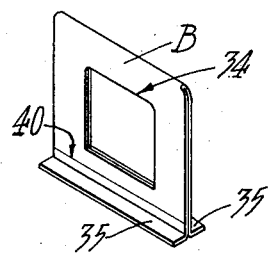
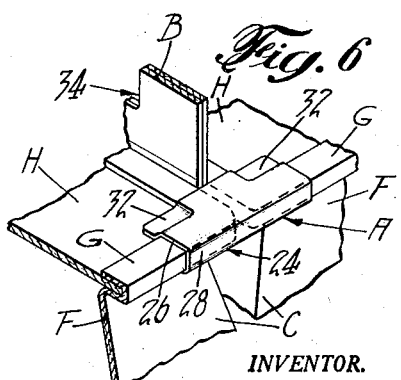
INVENTOR.
EDWARD O. THEN
BY Charles H. Erne
Leland R. McCann
George W. Reiber
ATTORNEYS July 29, 1958 E. O. THEN 2,845,175
COUPLING DEVICE FOR CONTAINERS
Filed April 25, 1955 2 Sheets-Sheet 2
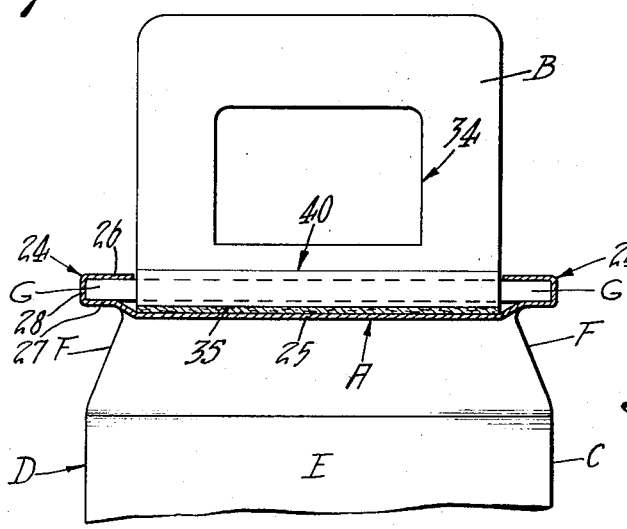
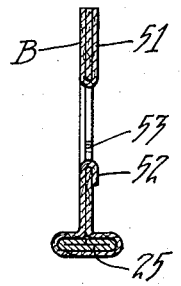
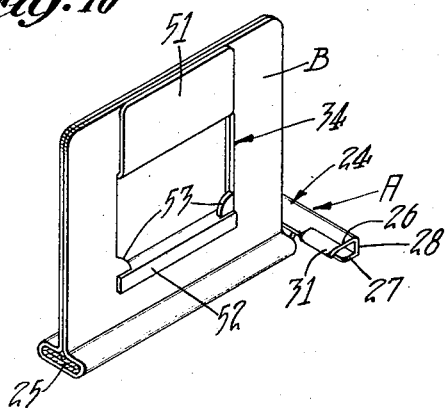
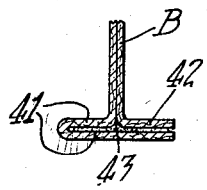
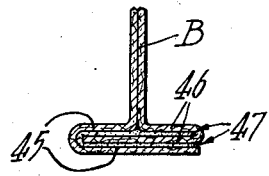
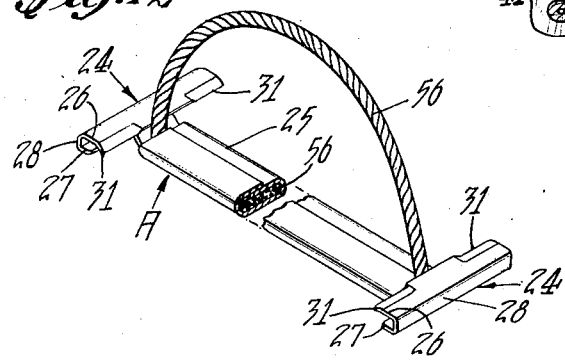
INVENTOR.
EDWARD O. THEN
BY *Charles H. Erne*
*Leland R. McCann*
*George W. Reiber*
ATTORNEYS

United States Patent Office 2,845,175
Patented July 29, 1958

2,845,175

COUPLING DEVICE FOR CONTAINERS

Edward O. Then, Newark, N. J., assignor to American Can Company, New York, N. Y., a corporation of New Jersey Application April 25, 1955, Serial No. 503,511

14 Claims. (Cl. 206—65)

The present invention relates generally to devices for carrying a plurality of containers and the like and has particular reference to a coupling device which may be used with or without a handle and which is adapted to connect together a plurality of containers for carrying as a unitary package.

In the marketing of certain products in containers, it is often advantageous for economy, convenience and other reasons to couple two or more containers together for sale as a unitary package. One example of such a product is fresh milk which is sold in one quart fibre containers. Since fresh milk is a rather heavy product due to its liquid character, it is more readily handled in smaller packages, such as one quart containers, than in large packages as in a single two quart container. For the same reason a coupling device may connect two milk containers in such a manner that they may be readily carried out without a handle but frequently due to the weight of the milk it is of advantage to include a handle with the coupling device.

In the past, two containers have been tied together with a paper band which is wrapped around the containers with its ends secured together in a suitable fashion. In some cases a handle has been provided. The handle usually is interposed between the containers and is often made as a part of the tie band. Sometimes the tie member is formed as a cover which fits over the tops of the containers and has a depending skirt to tie the containers together. It has been found that in some cases the band or cover fits loosely around or over the containers and thereby defeats the purpose of the tie member and often renders the handle useless since it fails to remain in carrying position. Also the coupling devices heretofore used have been rather expensive and require complicated machines to make and apply the component parts.

An object of the instant invention is the provision of a coupling device which is readily attached to each of a pair of adjacently disposed containers in such a manner as to securely tie or connect them together without surrounding them so as to eliminate any probability of the containers becoming loose and falling away from the tie member or permitting the containers to spread apart and thereby lose the handle if such a handle is used with the coupling device.

Another object is the provision of such a coupling device which may be readily combined with a handle and which may be provided as a preassembled unit for use and application to milk containers after filling in a dairy.

Another object is the provision of such a coupling device which is readily detachable from the containers to permit of the use of the containers individually.

Another object is the provision of such a coupling device which is simple and economical to produce so that it may be discarded after serving its purpose and yet is strong and rigid enough to carry a load of considerable weight so that it may be used for milk containers and the like.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a pair of juxtaposed fibre milk containers coupled together for carrying as a unitary package by a coupling device embodying the instant invention, the view also showing a handle in place for carrying the package;

Fig. 2 is an enlarged perspective view of a flat blank from which the coupling device illustrated in Fig. 1, is made;

Fig. 3 is a perspective view of a handle component which may be used with the coupling device;

Fig. 4 is an enlarged perspective view of the coupling device shown in Fig. 1, and the handle shown in Fig. 3 connected together as a preassembled unit for attachment to the containers as shown in Fig. 1, parts being broken away;

Fig. 5 is an enlarged sectional view showing the position of the coupling device and handle relative to the juxtaposed containers when connected therewith;

Fig. 6 is an enlarged fragmentary perspective view showing a slightly modified form of the coupling device and handle as applied to a pair of the juxtaposed containers;

Fig. 7 is a sectional view taken substantially along the line 7—7 in Fig. 5, with parts broken away;

Figs. 8 and 9 are enlarged sectional views showing modified forms of the lower marginal edge portion of the handle shown in Fig. 3;

Fig. 10 is an enlarged perspective view of a modified form of handle connected with the coupling device shown in Fig. 4, one end of the coupling device being broken away and shown in section;

Fig. 11 is a vertical sectional view of the handle illustrated in Fig. 10; and

Fig. 12 is an enlarged perspective view of a still further modified form of handle connected with the coupling device shown in Fig. 4; parts of the coupling device being broken away.

As a preferred or exemplary embodiment of the instant invention the drawings illustrate a coupling device A (Fig. 4) which may or may not include a handle B for connecting and carrying a pair of fibre milk containers C of the character disclosed in United States Patent 2,085,979, issued July 6, 1937, to John M. Hothersall, on Container. Such a container C comprises a rectangular body D having flat side walls E which at their upper ends are formed with necked-in portions F and an immediately adjacent outwardly or laterally projecting end seam or ledge G which surrounds the periphery of and secures in place a flat top member H. The end seam or ledge G is utilized by the coupling device A to tie together two such containers disposed in side-by-side or juxtaposed relation as shown in Fig. 1.

In this juxtaposed relation of the containers C, two side walls E are directly opposite each other in contiguous relation and the sections of the ledges G for these side walls extend transversely of the package and are substantially coincident. The immediately connecting sections of the ledges G, disposed at right angles to the ends of the transverse sections of the ledges, extend along the two long outer edges of the package in continuing or endwise alignment and are termed the outer longitudinally aligned ledges.

The coupling device A is a rigid member preferably made of sheet metal such as aluminum or tin plate and is interposable between two juxtaposed milk containers C in the region of the tops of the containers and secured to the projecting ledges G. When a handle B is used with the coupling device A, the handle projects above the tops of the containers to facilitate carrying them as a unitary package.

The coupling device A is of I shape configuration and preferably is made from a one-piece blank 21 (Fig. 2). The device comprises a pair of spaced and parallel horizontally disposed elongated gripper or coupling elements 24 (Fig. 4) connected substantially at their mid-points by a horizontally disposed bridge or connecting member 25 having a length slightly less than the length of one of the transverse or substantially coincident ledges G. Each gripper element 24 preferably is an elongated U-shaped channel member having upper and lower legs or flanges 26, 27 respectively, connected by an outer wall section or web 28. The open side of the channel member faces toward the bridge 25 and is disposed slightly above the bridge as best shown in Figs. 4 and 7. The inner or terminal edge of the upper legs 26 adjacent both ends of the gripper elements preferably are formed with inwardly and downwardly extending hook portions 31.

When the coupling device A is applied to a pair of juxtaposed containers C for securing them together in a unitary package as shown in Fig. 1, the bridge 25 is disposed between the containers and in engagement with the lower faces of the two adjacently disposed parallel or substantially coincident ledges or end seams G as shown in Fig. 5. The channel shaped gripper elements 24 at the ends of the bridge 25 are engaged over and tightly crimped against the adjoining or angularly disposed or longitudinally aligned ledges G as best shown in Figs. 1, 6 and 7, the hook portions 31 of the gripper elements 24 engaging over the inner top edge of the ledges.

In this manner the bridge 25 supports and bears most of the weight of the containers and holds the gripper elements 24 from spreading apart thus confining the containers against shifting along the bridge. Also the gripper elements 24 being tightly clamped or crimped against the outer longitudinal ledges of the containers retain the containers from movement laterally away from the bridge 25. The two containers are thus securely tied together or connected along opposing longitudinal ledges for carrying as a unitary package.

In a modified form of the coupling device A the coupling elements 24 adjacent the inner edges of their top legs 26 are formed with depressed substantially rectangular flat or lateral extensions 32 (Fig. 6) which engage over the inner edges of the ledges G and engage and lay flat against the tops H of the containers C to hold the coupling elements from displacement.

The bridge 25 of the coupling device A is adapted to be connected with a suitable handle if desired and may be made as a preassembled unit for attachment to and for use in carrying the package above described. A preferred form of handle such as the handle B shown in Figs. 1, 3, 4, 5 and 6 comprises a folded double thickness rectangular shaped member made of heavy stiff paper or cardboard and having an opening 34 therein for carrying purposes. The fold preferably is located at the top edge of the handle. The lower terminal edge portions of the handle preferably are bent outwardly or laterally in opposite directions to provide a pair of opposed horizontal flanges 35 (Fig. 3) extending substantially the full length of the handle. These flanges 35 preferably are imbedded in the bridge 25, the outer marginal edge portions of the bridge being provided with transverse slits or notches 37 (Fig. 2) adjacent the gripper elements 24 and the material of the bridge between the slits being bent upwardly and inwardly over the top of the handle flanges 35 and pressed tightly down against the flanges to clamp them and hold them securely against the top of the bridge as best shown in Fig. 4. In this connection with the bridge 25, the handle B extends vertically upward from and at substantially right angles to the bridge and projects up between and above the pair of substantially coincident ledges G as best shown in Fig. 5 so that the handle is above the tops of the containers and readily accessible for carrying the unitary package. Near its base, the handle B preferably is provided with a crease line 40 to provide for folding the handle down against the top of one of the containers C as shown in dot-and-dash lines in Fig. 5 to permit stacking of one unit package upon another.

In a modified form of the lower portion of the handle B to be imbedded in the bridge 25 as shown in Fig. 8 one lower terminal edge portion is made longer than the other and folded back on itself and on the opposite flange to provide a pair of laterally extending double thickness or layer flanges 41, 42. The double layers of the flanges preferably are bonded together with an adhesive 43 and are connected with the bridge 25 as in the preferred form.

In a second modified form of the lower end of the handle B as shown in Fig. 9, the lower terminal edge portions are bent back on themselves to overlap each other and also overlap the opposed flanges to provide a pair of laterally extending flanges 45, 46 of triple thickness or three layers. These layers also preferably are bonded together with an adhesive 47 and connected with the bridge 25 as in the preferred form.

As a further modified form of the handle B as shown in Figs. 10 and 11 the folded edge portions of the handle are located at the bottom of the handle and the handle is connected with the bridge 25 by being wrapped around or surrounding the bridge 25 as shown in Fig. 10. In this modified form of the handle the upper loose marginal edge portions are tied together by a flap 51 struck out from the material of one layer of the handle and extended through the opening 34 where it is folded back against the outer face of the opposite layer of the handle (see Fig. 11). The flap 51 may be adhesively secured in place if desired. In a similar manner the layers of the handle adjacent the lower edge of the opening 34 are tied together by a flap 52 which is struck out from the material of one layer of the handle and is extended through the opening 34 where it is folded down against the outer face of the opposite layer. A pair of lugs 53 projecting into the opening 34 and formed on the layer opposite the layer from which the flap 52 is struck are provided to hold the flap 52 in place.

In a still further modified form of handle, a piece of cord or heavy string 56 (Fig. 12) is utilized as a handle, the ends of the cord or string being held in clamped position under the folded over marginal edge portions of the bridge 25 as shown in Fig. 12.

The choice of the various handle constructions is primarily determined by the size and weight of the connected containers to be carried.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a unitary package comprising a pair of independent rectangular fibre containers having surrounding peripheral laterally projecting ledges, said containers being disposed in juxtaposed relation with portions of said ledges arranged in transverse parallel relation and other portions of said ledges arranged in endwise longitudinally aligned relation, the combination therewith of a pair of elongated channel shaped rigid coupling members arranged in spaced relation and having top and bottom legs clamped over and connecting adjacent opposed portions of said longitudinally aligned ledges for securing said containers together, and a rigid bridge member extending under said transverse parallelly related ledges between and connecting said coupling members to hold said coupling members against lateral displacement from said longitudinally aligned ledges.

2. A combination of the character defined in claim 1 wherein said bridge member engages under and against said transverse parallelly related ledges to bear the carrying weight of said connected containers.

3. A combination of the character defined in claim 1 wherein the inner terminal edges of said top legs of said channel shaped coupling members are bent inwardly and downwardly toward said bottom legs and engage over the inner edges of said ledges for locking said coupling members in place on said ledges.

4. A combination of the character defined in claim 1 wherein the inner terminal edges of said top legs of said channel shaped coupling members are formed with depressed lateral extensions projecting over the inner edges of said ledges and engaging along the flat tops of said connected containers for locking said coupling members in place.

5. A combination of the character defined in claim 1 wherein a handle is connected with said bridge member to facilitate carrying said package.

6. A combination of the character defined in claim 5 wherein said handle is provided with opposed laterally extending flanges and wherein said flanges are interfolded with flanges on said bridge member to tightly secure said handle to said bridge member.

7. A combination of the character defined in claim 5 wherein said handle is provided with opposed laterally extending flanges, one of said flanges having an extension bent back under and against said opposed flanges to provide a pair of double layer flanges and wherein said double layer flanges are clamped tightly against and along said bridge member by folded-over cooperating flanges on said bridge member.

8. A combination of the character defined in claim 5 wherein said handle is provided with opposed laterally extending flanges having extensions bent back under themselves and under the adjacent opposed flanges to provide a pair of triple layer flanges and wherein said triple layer flanges are clamped tightly against and along said bridge member by folded-over cooperating flanges on said bridge member.

9. A combination of the character defined in claim 5 wherein said handle is wrapped around said bridge member for connection therewith for carrying said package.

10. A combination of the character defined in claim 5 wherein said handle surrounds said bridge member and extends above said bridge member as a double layer member and wherein said layers are secured together against separation.

11. A combination of the character defined in claim 10 wherein one of said layers is formed with a flap bent into engagement with the other of said layers for securing said layers together against separation.

12. A combination of the character defined in claim 10 wherein said layers are formed with an opening and wherein one of said layers is formed with at least one flap struck out from said layer and extending through said opening and against said opposite layer for securing said layers together and wherein said opposite layer is provided with lugs for retaining said flap in holding position.

13. A combination of the character defined in claim 5 wherein said handle is a flexible cord-like member formed as a loop and connected with said bridge member to facilitate carrying said package.

14. A coupling device for a pair of rectangular containers having straight ledges projecting laterally from their upper ends, said device comprising a pair of spaced and parallel elongated channels, said channels being U-shaped in cross-section and being disposed with their webs in horizontally spaced vertical planes and their flanges in two vertically spaced horizontal planes and with the free edges of the flanges of each channel extending toward the corresponding free edges of the other channel, and a flat narrow strip-like bridge member integrally connecting the lower flanges of said channels at substantially their midpoints and lying substantially in the plane of said lower flanges, whereby in container coupling position said bridge member underlies opposing coincident ledges of said containers and said upper and lower channel flanges grip four of said ledges contiguous to said coincident ledges.

References Cited in the file of this patent

UNITED STATES PATENTS

| | | |
|---|---|---|
| 2,331,038 | Meller | Oct. 5, 1943 |
| 2,514,858 | Gray | July 11, 1950 |
| 2,557,801 | Shapiro | June 19, 1951 |
| 2,674,389 | Baker et al. | Apr. 6, 1954 |
| 2,675,264 | Lugt | Apr. 13, 1954 |
| 2,680,040 | Gribskov et al. | June 1, 1954 |
| 2,709,618 | Melville | May 31, 1955 |